J. KOSSUTH & C. HEROLD.
Mashing-Machines.
No. 157,613. Patented Dec. 8, 1874.
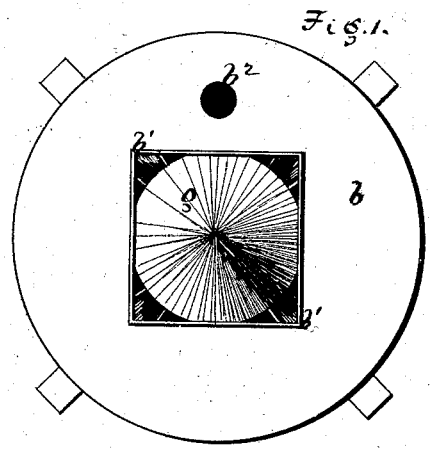
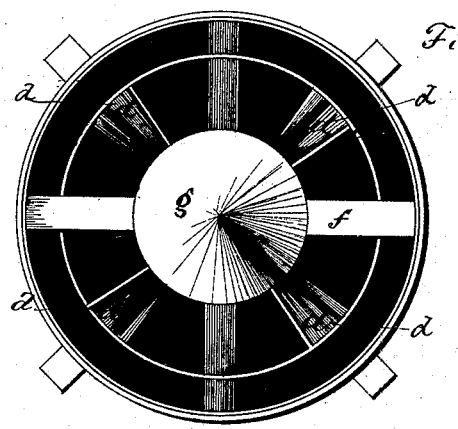
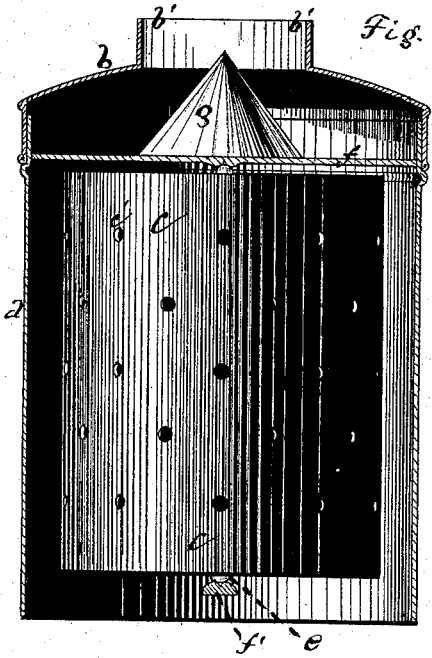
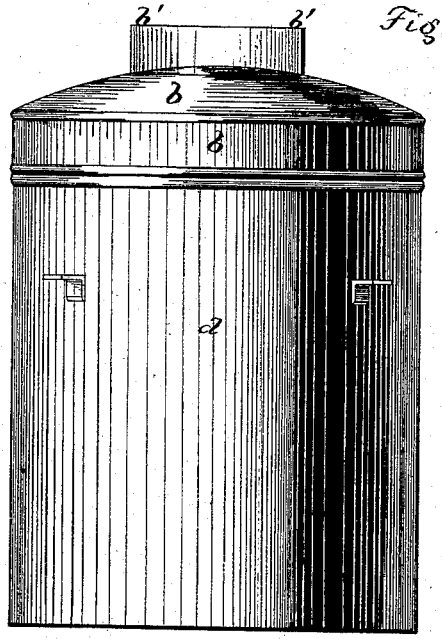
Witnesses.
Emmet Horton.
Hugh O'Flaherty.
Inventors
Charles Herold
Joseph Kossuth
By W. E. Simonds
Atty.

UNITED STATES PATENT OFFICE.

JOSEPH KOSSUTH, OF NEW BRITAIN, AND CHARLES HEROLD, OF HARTFORD, CONNECTICUT.

IMPROVEMENT IN MASHING-MACHINES.

Specification forming part of Letters Patent No. 157,613, dated December 8, 1874; application filed September 19, 1874.

*To all whom it may concern:*

Be it known that we, JOSEPH KOSSUTH, of New Britain, Hartford county, Connecticut, and CHARLES HEROLD, of Hartford, Hartford county, Connecticut, have jointly invented certain Improvements in Mashing-Machines, of which the following is a specification, reference being had to the accompanying drawings, where—

Figure 1 is a top view; Fig. 2, a side view; Fig. 3, a top view with the cover of the device removed. Fig. 4 is a side view with the exterior case and cover cut in central vertical section.

Mashing-machines are used in breweries to mix the malt and water. Such is the purpose of this device.

The letter $a$ indicates a round metallic case having a cover, $b$, with a central opening, $b^1$, for the malt to enter, and an opening, $b^2$, for the water. Within the case $a$ is hung a rotating mixer-wheel composed of the outer annular band $c$, (preferably perforated by holes $c'$,) the flukes, $d$, and the central shaft $e$ hung, by its ends, in the two cross-bars $f f'$, on the upper of which is set the distributing-cone $g$. The malt, entering through the mouth $b^1$, falls upon the cone $g$, and is scattered or distributed below. The water, entering through the mouth $b^2$, falls, with the malt, upon the flukes $d$, causing the mixer-wheel to rotate rapidly, and thus to mix the water and malt intimately. As to the form of the flukes $d$ it is only essential that they be so shaped that the passage of the water will cause them to rotate. The parts are metallic, commonly of copper. After the water and malt are mixed they fall down below into a proper receptacle.

An important and essential feature of this device is that the water should be so delivered upon the rotating mixer-wheel, as not only to mix intimately with the malt, but also to cause the rotation of the mixer-wheel, and thus dispense with the application of and necessity for extrinsic driving-power.

We claim as our invention—

The combination of the malt-distributing cone, the horizontally-rotating mixer-wheel underneath the cone, and the water-delivery mouth arranged with reference to the mixer-wheel as to cause the water escaping therefrom to both mix with the malt and cause the rotation of the mixer-wheel, all substantially as shown and described.

JOSEPH KOSSUTH.
CHARLES HEROLD.

Witnesses:
WM. E. SIMONDS,
CHAS. W. CLIFT.